June 14, 1932. H. L. KITTS 1,863,309
MOTION PICTURE PROJECTOR
Filed April 5, 1930 2 Sheets-Sheet 1
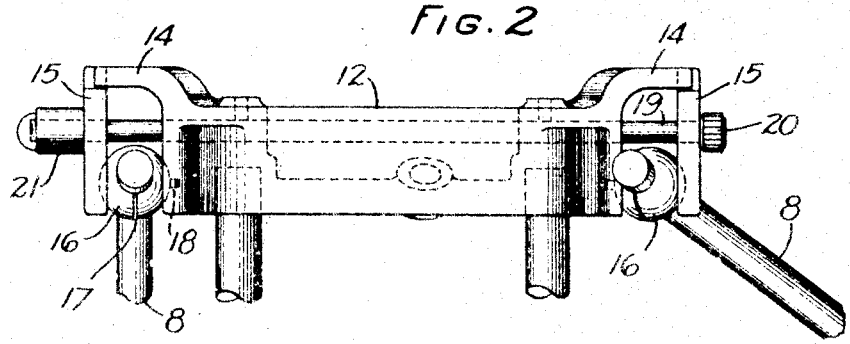
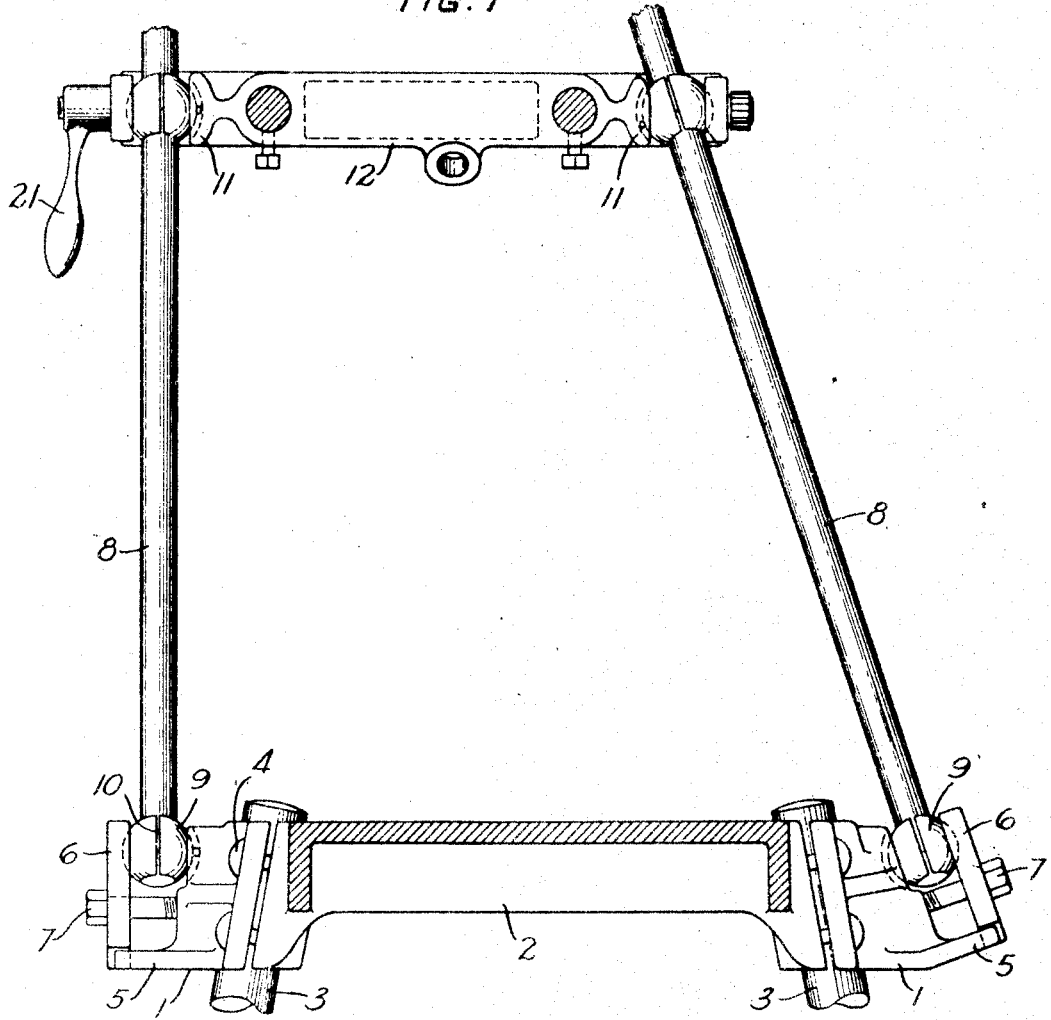
INVENTOR
H. L. KITTS
BY
G. H. Heydt
ATTORNEY

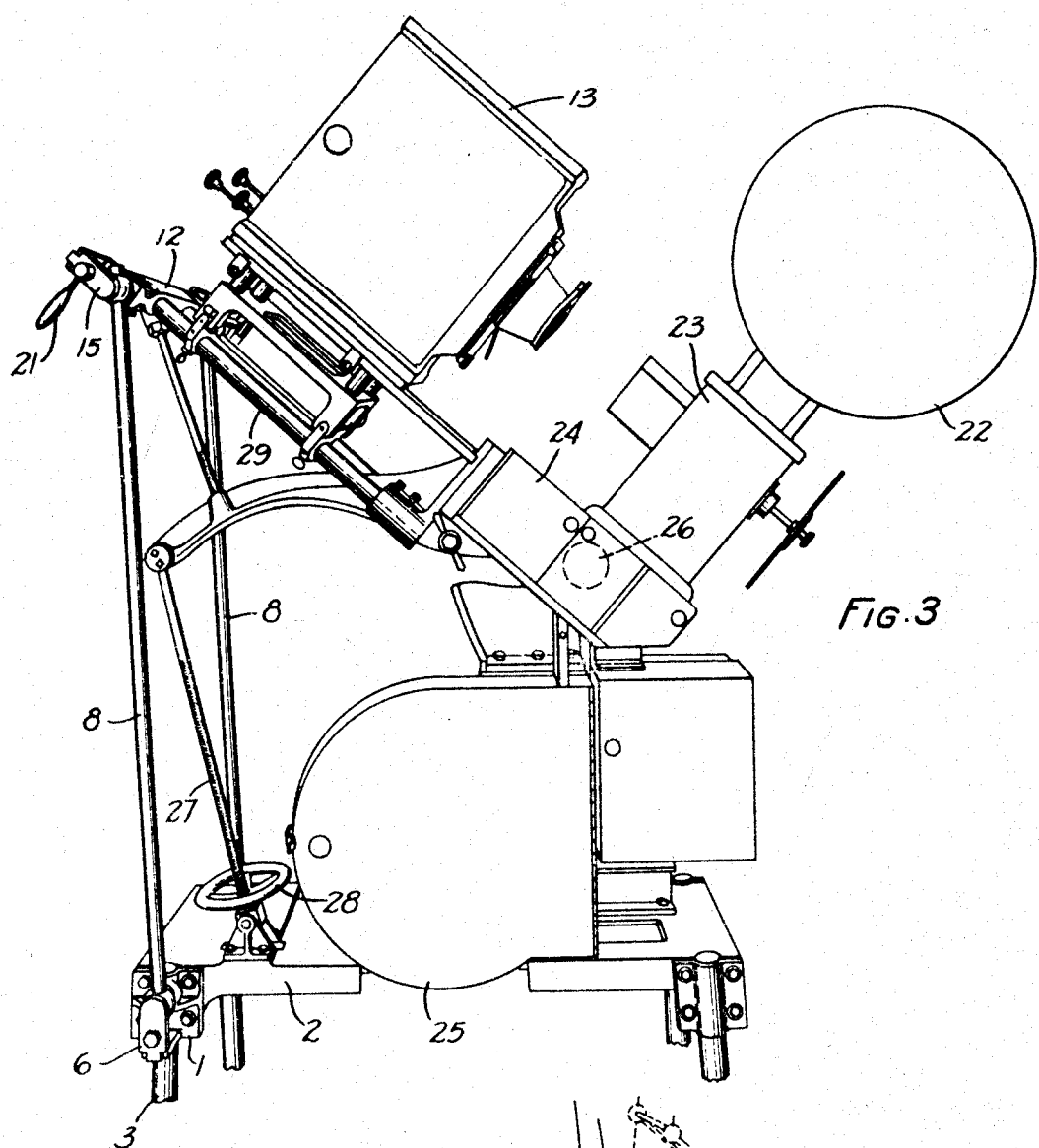
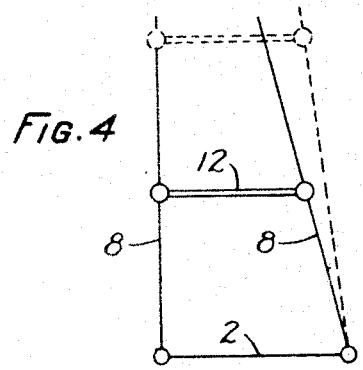
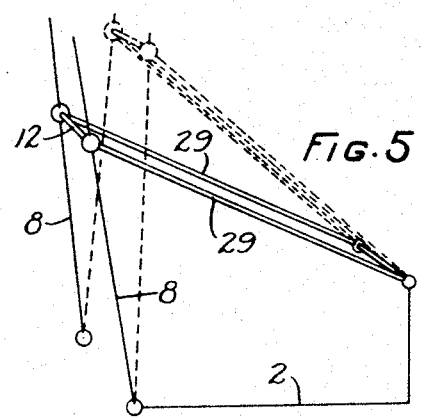

Patented June 14, 1932

1,863,309

UNITED STATES PATENT OFFICE

HOWARD L. KITTS, OF GRANT CITY, NEW YORK, ASSIGNOR TO BELL TELEPHONE LABORATORIES, INCORPORATED, OF NEW YORK, N. Y., A CORPORATION OF NEW YORK

MOTION PICTURE PROJECTOR

Application filed April 5, 1930. Serial No. 441,781.

This invention relates to motion picture projectors, and more particularly to means for reducing the flicker on the screen due to vibration of the projecting light.

The construction of very large motion picture playhouses with a corresponding increase in the area of the projection screen and the throw of the projection light from the booth to the screen has led to the use of very powerful projection lights. This increase in the power of the projection light has been accompanied by a corresponding increase in the dimensions of the light and its enclosing lamphouse and in the weight of the unit. The projector mechanism and the film must be protected from the stray heat generated by this light and the light must also be so located that it is convenient for operation and adjustment. These requirements are most easily met when the lamphouse is located on a bracket supported by the pedestal of the projector and extending to the rear. In this location, however, due to the lack of rigid support the lamphouse is subject to considerable vibration, particularly lateral vibrations and the resultant change in the focus of the light source causes the projected picture to appear to flicker on the screen.

In sound picture projectors the sound reproducing mechanism is commonly located in the base of the projector where it will be protected from vibrations due to the intermittent mechanism of the picture projecting unit. The line of projection of the picture must be capable of being depressed through a wide angle to adapt the projection to wide variations in the size and shape of the theatres. As the film must pass from the picture projecting mechanism to the sound reproducing mechanism, in order to avoid an undesirable kink in the line of motion of the film, the horizontal axis of the projector is commonly located near the front of the projector. Locating the horizontal axis of the projector at the front increases the distance from the lamphouse to this axis and the resulting lack of balance increases the vibration of the lamphouse.

Attempts have been made to reduce the vibration of the lamphouse by means of braces extending from the bracket supporting the lamphouse to the floor of the projection booth, but these attempts have not proved successful as the braces transmit the vibrations of the floor to the lamphouse and in some cases cause an increase in the flicker.

The object of the invention is to provide a means of reducing the vibration of the lamphouse of a motion picture projector.

A feature of this invention is the provision of supports extending from the base of the projector to the bracket supporting the lamphouse.

Another feature of this invention is the provision of means whereby the supports may be readily adapted to variations in the size of the projector base and lamphouse bracket.

A further feature of this invention is the provision of means whereby the supports for the lamphouse bracket may be readily clamped at any desired elevation and readily shifted from one elevation to another. This feature permits a rapid change in the angle of projection as required, for example, in changing from front of stage to rear of stage screening.

In the preferred embodiment of the invention a cup-shaped member is attached to each side of the base of the projector. Two supports of convenient size and length are supported in these cups by means of split balls pinned to the end of the supports. The split balls are retained in the cup-shaped members by cover plates shaped to fit over the balls and secured to the projector base. Similar cup-shaped members are attached to or formed in the bracket supporting the lamphouse and support split balls through which the supports can be freely moved. An adjustable clamp plate shaped to fit over the upper balls is secured to a convenient part of the lamphouse bracket. A tension rod extending the full length of the bracket is adapted to compress both cover plates on the corresponding split balls, thus clamping the supports. A single clamp lever is threaded on one end of the tension rod. The operation of this lever will cause the tension rod to compress the cover plates inward on the split balls, compressing the balls on to the supports and firmly securing the supports at any desired point. A pin inserted in each split ball insures that the split in the ball will be normal to the pressure of the cover plate.

In the drawings Fig. 1 is a side elevation of a preferred embodiment of the invention.

Fig. 2 is a top view of the lamphouse bracket showing the clamp of the invention in greater detail.

Fig. 3 is a side elevation of the invention adapted to a typical motion picture projector.

Fig. 4 and Fig. 5 are diagrammatic elevations of the invention showing the angular relations involved in a change in the angle of projection.

Referring to the drawings, a member 1 having a cup-shaped surface is formed in or attached to the base 2 of the projector. This member 1 may conveniently be designed to serve also as a clamp for the legs 3 of the base 2. Suitable bolts 4 secure the clamp to the base 2 and may be slackened to permit the legs 3 to be adjusted. A projection 5 is formed in the member 1 and serves as a support for one end of the member 6. The member 6 is retained in place by the projection 5 and the screw 7. The upper end of the member 6 forms a cup-shaped surface which is aligned with the cup-shaped surface of the member 1. Secured to the lower end of the supports 8, are ball-shaped members 9 supported and retained by the opposed cup-shaped surfaces formed in members 4 and 6. By means of the screw 7 the member 6 may be pressed as tightly as desired on the ball 9. The ball 9 is pierced centrally by a hole slightly larger than the supports 8 and radially divided by the slot 10 and is pinned to the end of the support 8 so that the slot 10 is normal to the direction of the pressure exerted by the member 6. The pressure exerted by the member 6 compresses the ball 9 partially closing the slot 10. The natural elasticity of the material of the ball 9 holds the ball firmly yet resiliently in the cup-shaped members 4 and 6.

Cup-shaped surfaces 11, 11, are formed in the ends of the lamphouse bracket 12 which forms the rear element of the support for the lamphouse 13. Projections 14, 14 are formed on the ends of the bracket 12, and serve as supports for one end of clamping members 15, 15. A cup-shaped surface is formed near the other end of clamp members 15, 15 aligned with the cup-shaped surfaces formed on the ends of the bracket 12. Seated in the opposed cup-shaped surfaces of the bracket 12 and the members 15, 15 are suitable ball-shaped members 16, 16. The ball-shaped members 16, 16 are pierced centrally by a hole slightly larger than the supports 8, 8 and are radially divided by the slot 17. Pins 18 secured in the bracket 12 retain the ball-shaped members 16, 16 so that the slots 17, 17 are always normal to the direction of the pressure exerted by the clamping members 15, 15. A rod 19 is loosely mounted in a suitable hole longitudinally formed in the bracket 12. One end of the rod 19 is formed into a head 20 bearing on one of the members 15. The other end of the rod 19 is suitably threaded to receive a handle 21 which may be screwed on the rod 19 until the handle 21 bears on the other member 15. By further screwing the handle 21 on the rod 19, both of the members 15, 15 will be drawn inward compressing the ball-shaped members 16, 16 on the supports 8, 8 and securely clamping the bracket 12 to the supports 8, 8. By unscrewing the handle 21, the pressure of the members 15, 15 on the members 16, 16 is relieved and the natural resilience of the members 16, 16 will cause them to spring away from the supports 8, 8 and allow the bracket 12 to be moved along the supports 8, 8. As only a small movement of the handle 21 is necessary to release the clamp, the bracket 12 may be readily released for adjustment along the supports 8, 8 and readily clamped in the new position.

The motion picture projector illustrated in Fig. 3 includes a film reel 22, from which the film is drawn by suitable mechanism 23 through which the picture is projected by means of light supplied by a lamp in the lamphouse 13. If the projector is adapted also for the reproduction of sound from a sound record on the film, the film is drawn through suitable mechanism 24 by which the sound record may be reproduced. The film is then reeled upon a suitable take-up reel mounted in housing 25.

Due to the large differences in the size and shape of the theatres and in the location of the projection room in the theatre, a motion picture projector must be designed so that the line of projection may be elevated above or depressed below the horizontal. In order to avoid an undesirable kink in the film, the horizontal axis of the projector is generally located near the front, as indicated by the dotted circle 26. The lamphouse 13 is slidably mounted on two rods 29, 29 supported by a bracket suitably pivoted about the horizontal axis 26, and secured to the bracket 12. The bracket 12 is adjustably elevated and supported by the threaded rod 27 and hand wheel 28. By operating the hand wheel 28 the angle of projection may be readily changed as required, for example in changing from front of stage to rear of stage screening.

A motion picture projector of the type described is composed of the following structural elements: (1) a base which is normally horizontally located; (2) a vertical portion which performs the function of a pedestal; (3) a bracket extending rearwardly and pivoted about the top of the vertical portion. For good dynamic balance of the projector the base should be wider than the bracket. As diagrammatically illustrated in Fig. 4, when the bracket 12 is elevated, the supports 8 must rotate in a plane normal to the line of projection. Also, as diagrammatically illustrated in Fig. 5, the bracket is pivoted about a center vertically removed from the base while the supports are attached to the base. Thus when the bracket 12 is elevated, the supports 8 must rotate in a plane parallel to the line of projection. As these two rotations occur simultaneously the supports must be attached to both the base and the bracket in such a way that the supports may rotate in all directions. This result is secured by the novel ball and socket connection of the invention. The ball and socket connection has the added advantage that a standard size of supports will readily be adapted to minor variations in the size of the base or bracket.

What is claimed is:

1. In a motion picture projector in combination, a base, a plurality of sockets supported by said base, a plurality of supports terminating in balls seated in said sockets, a bracket supported by said base, other sockets supported by said bracket, a plurality of balls seated in said other sockets and slidably mounted on said supports, and means to simultaneously clamp all said slidable balls on their respective supports.

2. In a motion picture projector in combination, a base, a plurality of sockets supported by said base, a plurality of supports terminating in balls individually seated in said sockets, individually adjustable cover plates retaining said balls in said sockets, a bracket supported by said base, other sockets supported by said bracket, other balls centrally pierced and radially sloted seated in said other sockets and slidably mounted on said supports, individual cover plates for retaining said sloted balls in said other sockets, and means for simultaneously compressing said cover plates on said slotted balls to retain said supports in an adjusted position.

In witness whereof, I hereunto subscribe my name this 4th day of April, 1930.

HOWARD L. KITTS.